United States Patent [19]

Conkerton

[11] 4,087,179
[45] May 2, 1978

[54] BOOK HOLDER FOR MICROFILMING

[76] Inventor: Lawrence J. Conkerton, P.O. Box 1166, Baton Rouge, La. 70821

[21] Appl. No.: 743,239

[22] Filed: Nov. 19, 1976

[51] Int. Cl.$^2$ ............................................. G03B 27/62
[52] U.S. Cl. ........................................................ 355/76
[58] Field of Search ............... 355/75, 76, 82; 354/89, 354/90

[56] References Cited

U.S. PATENT DOCUMENTS

| | | | |
|---|---|---|---|
| 1,148,127 | 7/1915 | Stratton | 354/89 X |
| 1,254,195 | 1/1918 | Beidler | 355/82 |
| 1,267,358 | 5/1918 | Beidler | 355/75 UX |
| 3,494,696 | 2/1970 | Henry et al. | 355/75 |
| 3,625,610 | 12/1971 | Raymond | 355/76 |

FOREIGN PATENT DOCUMENTS

| | | | |
|---|---|---|---|
| 588,158 | 5/1947 | United Kingdom | 355/76 |
| 676,972 | 8/1952 | United Kingdom | 355/75 |
| 912,100 | 12/1962 | United Kingdom | 355/82 |

*Primary Examiner*—Donald A. Griffin

[57] ABSTRACT

A holding device for books being filmed by microfilm cameras comprising a generally rectangular-shaped, box-like structure having a bottom, front, back and side walls, a transparent cover which can be raised for loading books therein, and means within the holding device for lifting the book up against the transparent cover during filming.

7 Claims, 3 Drawing Figures

BOOK HOLDER FOR MICROFILMING

BACKGROUND OF THE INVENTION

1. Field of the Invention

The present invention relates to a novel holding device for books being filmed by microfilm cameras.

2. Description of the Prior Art

In the field of microfilming records for permanent storage and preservation, no task is quite as difficult as filming bound books, particularly research records contained in books which are sewn across the book spine. The filmed image is often blurred at the page edges.

Due to the relative haste of filming large volumes of documents, the filming defects are not discovered until it is often too late to correct, or it is expensive and iconvenient to refilm the material if large numbers of pages are defective.

No effective prior art devices are known which solve the above problem and which permits fast, accurate filming of substantial volumes of bound, printed or written matter.

SUMMARY OF THE INVENTION

I have invented a holding device for books being filmed by microfilm cameras which comprises a generally rectangular-shaped, box-like structure, having a bottom, four walls, and an upper hinged, transparent cover, and having mounted internally therein at least two book-lifting means which operate to maintain pressure, against a book resting thereon, in the direction of the upper hinged, transparent cover. In the preferred embodiment, the book-lifting means are movable in an up and down direction, in relation to the top and bottom of the book-holding device and are held secure from lateral movement by guide means fixed to a combination of the holder walls. Upward pressure is ideally provided by springs or equivalent means on the underside of the book-lifting means. Other preferred embodiments and refinements are more fully described hereiafter.

DESCRIPTION OF THE PREFERRED EMBODIMENTS

The invention will be more readily understood from a reading of the following specification and by reference to the accompanying drawings wherein an example of the invention is shown, and wherein.

Figure 1:
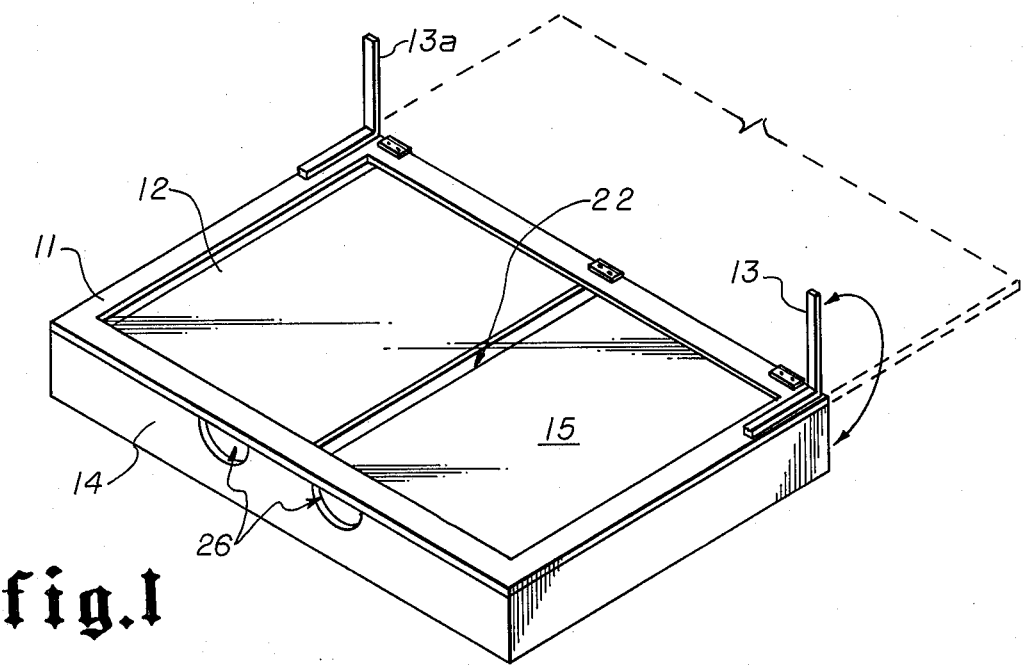
FIG. 1 is a perspective view of a preferred embodiment of book-holding device of the invention.

In the drawings, the numeral 15 designates the book-holding device of the present invention. FIG. 1 illustrates the general construction of book holder 15, having a generally rectangular configuration. As illustrated, book holder 15 comprises a structure having a bottom 11 (as shown in FIG. 3), four side walls extending upwardly from the bottom 11, the front wall 14 having openings 26 through which an operator can extend his/her arms for turning the book pages, and a transparent cover 12 affixed to at least one wall of the book holder 15.

Figure 2:
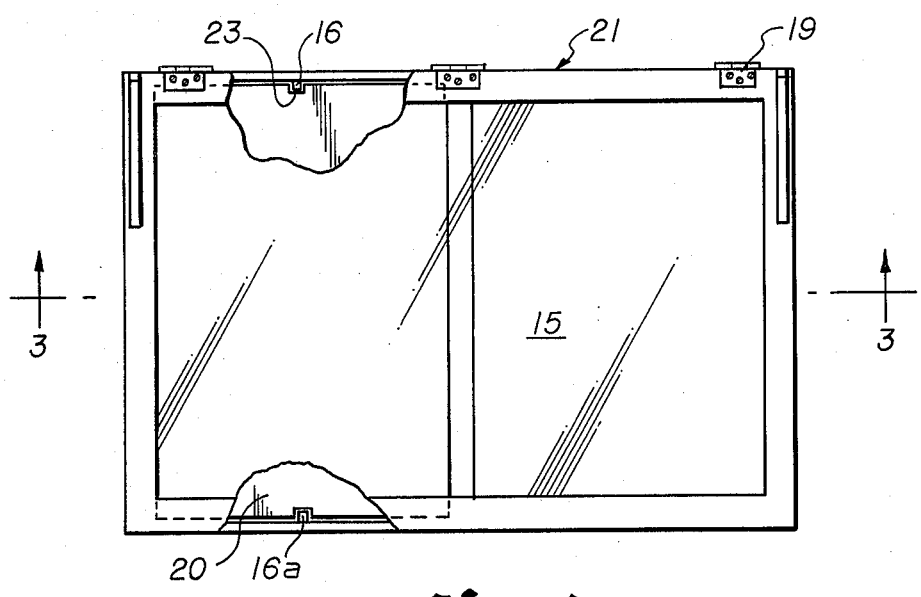
FIG. 2 is a plan, top view of the holding device, partially cut away to illustrate the book-lifting guides.

As shown in FIGS. 1 and 2, the transparent cover 12 is attached to the rear wall 21 of the book holder 15 by means of hinges 19, which enables the microfilm operator to lift the cover up to remove the filmed book. Use of the book holder is aided by a brace means 13 and 13a, which holds the cover 12 in a supported position while a new book is being placed in the book holder 15.

Figure 3:
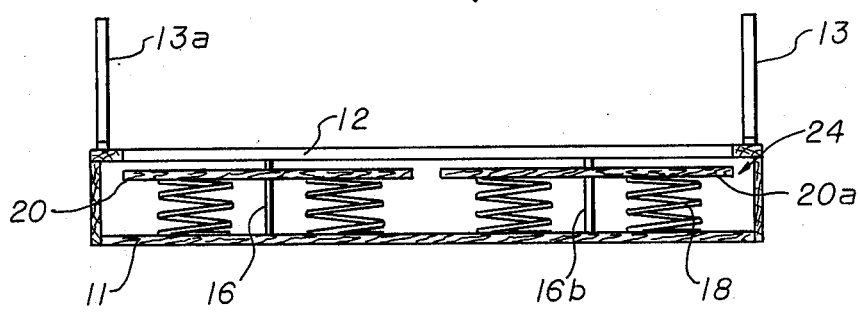
FIG. 3 is a transverse, vertical, sectional view taken on the line 3—3 of FIG. 2.

One of the unique features of the present invention is the independently opeating book-lifting means 20 and 20a, shown best in FIG. 3, which as illustrated, are mounted on springs 18 or other equally acting means. The book-lifting means 20 and 20a operate in an up and down mode and are in a side-by-side relationship. They operate to cause a constant pressure of the book's pages against the transparent cover 12, regardless of the relative thickness of either half of the book being filmed. This is the feature that provides uniform, good quality filming of the books' written material, one of the most sought-after goals of the microfilming industry.

Guides 16 and 16a are positioned on the front and rear walls of book holder 15 in order to prevent lateral movement of the book-lifting means 20. In FIG. 3, rear guide 16b and an opposite guide, not visible, is shown serving the same purpose for book-lifting means 20a. It is intended that the illustrated guiding means shown and described above are by way of example only. They may be omitted without seriously affecting the operation of the present invention. In addition, their location and number is not critical. For example, a series of guides may be used, and they may be placed in virtually any configuration which provides a steady and easy vertical movement of the book-lifting means 20 and 20a.

The springs 18 may be fixed to either the bottom of lift means 20 (and 20a); they may be fixed to the bottom 11 of the book holder 15, or they may be attached to both elements. It is preferred that there be some open space 22 between the book-lifting means 20 an 20a. The same holds true with the spacing 24 between the book-lifting means 20 and 20a and the side walls of the holder 15.

Construction of the book-holding device 15 with the spaces 22 and 24, described above, allows more freedom of movement and ease of operation. The guides 16 and 16a, as well as, 16b and its opposite partner (not shown) are received in mating grooves (represented by numeral 23) located in each book-lifting means 20 an 20a.

The transparent cover 12 is shown in FIGS. 1 – 3 having a frame 11 extending around the outer edges of the cover. However, this is merely an optional configuration. If desired, the entire transparent cover 12 may be one piece of transparent material, such as Plexiglas. As shown, the cover 12 is regular glass held in a wooden frame 11.

The materials of construction of all components are optional and apparently not critical. Their choice is dictated by desired weight, strength requirements and intended environment. For camera operators who operate mobile camera equipment, it may be more desirable to have relatively light-weight materials such as aluminum. Practically, wood, metal, plastic or a combination of these materials would be suitable for constructing the present invention.

There are various refinements that may be added or omitted from the device of the present invention. They will be discussed hereinbelow, but they are in no way intended to limit the scope of the present invention.

The springs 18 may be replaced by any means suitable for applying pressure in the manner hereinabove described. The main limitation on this aspect of the invention is that the book-lifting means 20 and 20a must be independently acting in an up and down manner and be of such dimensions as to adequately hold a book placed thereon.

There is no real need for the transparent cover 12 to be hinged, in the manner shown or in any other manner. Other mechanisms for raising and lowering the cover could be used, perhaps more conveniently. In addition, although not shown, the cover could be raised and lowered by mechanical devices operated by a foot-activated means.

Other modifications of this invention will be readily apparent from the foregoing description of several preferred embodiments and it should be understood that the true scope of this invention is defined by the appended claims.

I claim:
1. A holding device for books being filmed by microfilm cameras which comprises
    a generally rectangular-shaped, box-like structure, having a bottom, four wals and an upper-hinged, transparent cover,
    having mounted internally therein at least two book-lifting means in a side by side relation which operate to maintain pressure, against a book resting thereon, in the direction of the upper-hinged, transparent cover, each book-lifting means being independently operable, and
    wherein the book-lifting means are guided in an up and down relation to the device by means of vertical guides attached to the inner surface of at least the front and rear walls of the book holding device and wherein the vertical guides are received in matching indentations located in the book-lifting means.

2. The book holding device of claim 1, wherein the front wall of the device has openings through which an operator may turn pages of a book resting upon the book-lifting means.

3. The book holding device of claim 1, wherein the transparent cover is hinged on the upper edge of the rear wall of said device.

4. The book holding device of claim 1, wherein the box-like structure is made from wood.

5. The book holding device of claim 1, wherein the box-like structure is made from plastic.

6. The book holding device of claim 1, wherein the transparent cover is glass.

7. The book holding device of claim, wherein the two book-lifting means have affixed to and positioned beneath each such platform a spring.

* * * * *